Jan. 2, 1940.　　　　E. C. RYAN　　　　2,185,269
CURRENT COLLECTOR
Filed Aug. 3, 1938

Inventor
EDMUND C. RYAN.
By
Attorney

Patented Jan. 2, 1940

2,185,269

UNITED STATES PATENT OFFICE 2,185,269

CURRENT COLLECTOR

Edmund C. Ryan, Mansfield, Ohio, assignor to The Ohio Brass Company, Mansfield, Ohio, a corporation of New Jersey Application August 3, 1938, Serial No. 222,866

4 Claims. (Cl. 191—59.1)

My invention relates to current collecting devices for gathering current from an overhead trolley wire whereby it may be utilized in electrically operated vehicles.

One of the objects of my invention is to provide a current collecting device in which a carbon insert contacts with the trolley wire and in which the means by which the insert whether of carbon or other material is held permits of readily renewing the insert.

Other objects will be apparent as I further disclose the construction and operation of my invention.

My invention resides in the new and novel construction, combination, and relation of the parts herein described and shown in the drawing accompanying this specification.

Figure 1:
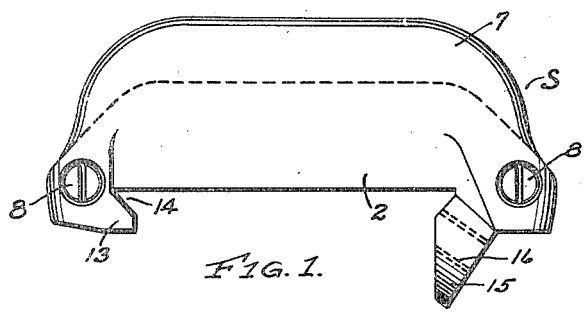
Fig. 1 is a side view of what I term the "shoe" and which forms a part of my invention.
Figure 2:
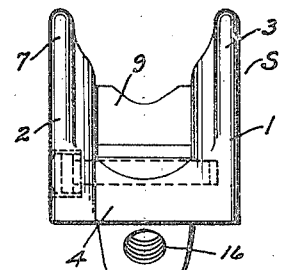
Fig. 2 is an end view of Fig. 1.
Figure 3:
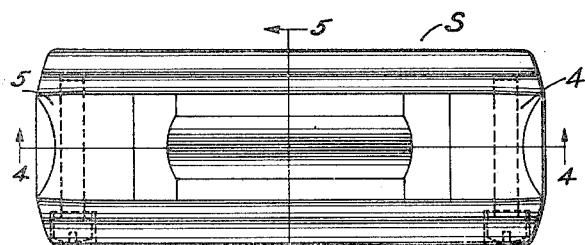
Fig. 3 is a top view of Fig. 1.

Many problems are arising constantly in connection with the current collecting means for use on trolley buses in particular.

The conditions of operation present many new problems as compared with those met with in connection with street cars operating on rails.

It has been found of considerable advantage to use a carbon member to contact with the trolley wire but due to the nature of the material the problem of safely holding the insert and means whereby it may be quickly and inexpensively changed must be met.

In the preferred embodiment of my invention herein disclosed, I provide a shoe S comprising a body of metal, either ferrous or nonferrous, preferably the latter, having a carbon insert.

The body comprises two parts, namely, part 1 which I will refer to as the holding member and part 2 which I will refer to as the clamping member.

The holding member 1 is provided with an upwardly projecting side wall 3 and end portions 4 and 5 which project transversely with respect to the side wall and form therewith a recess 6 which is open at the top and bottom and at one side.

The open side of the recess is closed by means of the clamping member 2 which has an upwardly projecting side wall 7 and which forms with the side wall 3 retaining means to prevent the accidental dewirement of the shoe.

The parts 1 and 2 are held in operative relation by means of screws 8, one at each end of the shoe. When the clamping member 2 is in operative relation with respect to the holding member 1, the recess 6 will be closed on the four sides but open above and below.

Positioned in the recess 6 is an insert or contact member 9 formed preferably of carbon although it may be of metal. The insert is formed with parallel side faces of two widths a and b, and with longitudinally extending side shoulders 10. The members 1 and 2 are each formed with a shoulder 11 cooperating with the shoulders 10 to hold the insert 9 against displacement upwardly. The shoulders 10 are usually placed midway of the upper and lower faces of the insert as shown by c and d, but may be otherwise placed.

The lower face of the insert 9 is shown flush with the lower faces of the members 1 and 2 thereby the insert is held against displacement downwardly through engagement with the support member 12.

The support member 12 is formed with a longitudinal groove of substantially the same width as the width of the lower portion of the shoe and is adapted to receive the shoe. The shoe is provided at one end with a hook 13 forming a transverse channel 14 and is provided with a depending lug 15 at the other end. The lug 15 has an obliquely threaded opening 16 to receive the cap screw 17.

I am not claiming the support for the shoe in detail as my invention, as it is disclosed in Larsson Patent 2,044,886 issued June 23, 1936.

Briefly, the support 12 is provided with a projection 18 having a spherical bearing surface mounted on a support 19 having a receptacle with a spherical bearing surface to receive the projection 18, thus permitting the shoe to pivot and oscillate relative to the support 19.

The support 12 is further held in position by means of the member 20 which engages with the support 19.

The transverse groove 14 of the shoe interlocks with a projection 21 on the support 12. The screw 17 draws the shoe into proper holding engagement with the support 12 and the member 20. The support 12 is secured to the member 20 by the cap screws 22.

Figure 6:
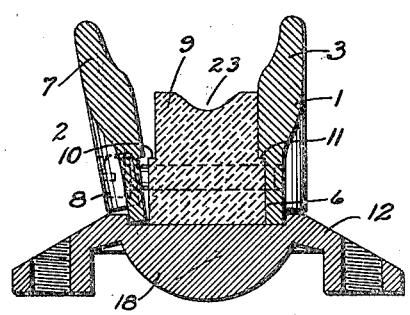
Fig. 6 is a transverse view in section of the shoe shown in Fig. 3 together with its immediate supporting member and shows the manner in which the replaceable contact or insert may be easily renewed.
Figures 7, 8:
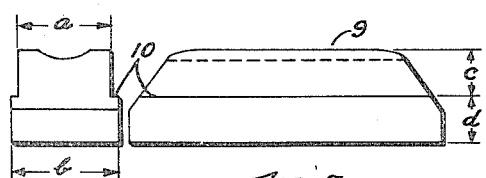
Fig. 7 is a side view of the insert.
Fig. 8 is an end view of Fig. 7.
Figure 4:
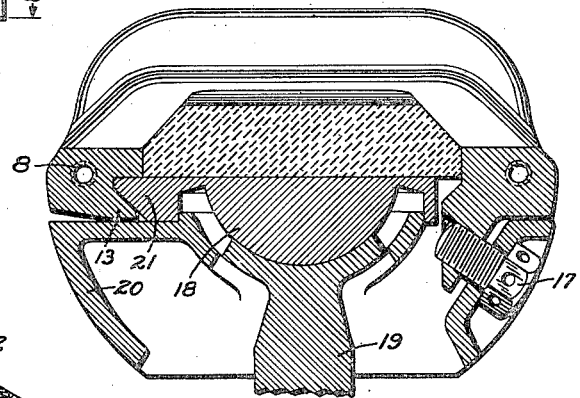
Fig. 4 is a longitudinal view in section in a vertical plane taken on the line 4—4 of Fig. 3 and includes supporting means for the shoe.
Figure 5:
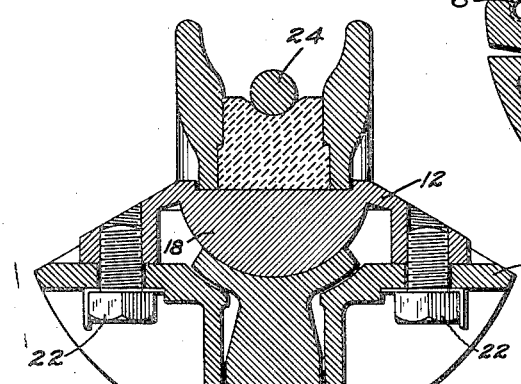
Fig. 5 is a view in section in a vertical plane on the line 5—5 of Fig. 3 and includes supporting means for the shoe.

The screws 8 engage with the holding member 1 in such a manner that when it is desired to renew an insert 9 it is only necessary to back off the screws 8 sufficiently to allow the clamping member 2 to swing away from the insert so that the shoulders on the insert are free to pass the shoulders on the members 1 and 2 in the manner shown in Fig. 6. Thus it is not necessary to remove the shoe from its support to renew a worn-out insert.

Inserts have been held in position within the holding members by forming merely a shoulder on the holding and clamping members which will overlap the upper longitudinal edges of the insert, but this method of holding the insert has been found to be lacking in efficiency for the reason that very often the side members of the holding frame will become worn as by contact with the trolley wire, thus wearing away the shoulders on the side members and permitting the insert to become loose.

In my improved insert and holder, the shoulders 10 and 11 are placed well down on the parts so that if wear should take place upon the members 1 and 2 from contact with the trolley wire, the shoulders 11 will not be worn away until the insert has been worn to a degree where it must be replaced. This is a decided improvement of both the insert and the holding and clamping members therefor over prior constructions. Also the portion of the insert above the shoulders 10 may be completely worn away and still the remaining portion will be rigidly held in place.

The insert is formed with a longitudinal groove 23 to cooperate with the trolley wire 24 to center the shoe with respect to the trolley wire as soon as put into operation. This groove 23 has a strong tendency to maintain the shoe central of the trolley wire and produce an even wear to the insert, thus avoiding wear upon the holding members 1 and 2 thereby making it unnecessary to renew the members 1 and 2 as a rule until after several inserts have been worn-out. Inserts are cheaper than the members 1 and 2.

It will be noted that from the shoulder 10 on the insert to the lower face of the insert, there is no cutaway portion and, therefore, the shoulder forms a very substantial and rigid interlock with the holding and clamping members which is not easily broken or destroyed.

The insert is one which is very easily and cheaply made as its design will permit of its being extruded either from carbon or metal, thus permitting a single saw cut to sever an insert from a bar of metal, and requiring very little labor to finish the ends as against rounding the end faces as is customary.

While I prefer to make the slot in the member 12 of just sufficient width to permit pivoting or tilting the member 7 to allow for renewal of the insert 9, the slot may be of greater width to permit the side member 7 to be moved directly away from the insert without tilting or pivoting the member 7, a sufficient distance to allow the shoulders 10—11 to clear.

Modifications will suggest themselves to those skilled in the art, therefore, I wish to be limited only by my claims.

I claim:

1. A current collector shoe for mounting on a support and collecting current from a trolley wire, comprising an elongated holder portion and a clamping portion and a separately formed insert to engage the trolley wire, the said portions being separately formed and providing a rectangular recess therebetween in which the insert is positioned, means at one end of one portion of the shoe to cooperate with means on a support to hold said end in position and means on the other end of the last said portion to cooperate with means on the support to draw said shoe into and hold it in position the other portion of the shoe being laterally adjustable without disturbing the assembly of the aforesaid one portion with respect to the support; the insert having longitudinal shoulders, one on each side face of the insert and intermediate the upper and lower longitudinal edges of the insert; longitudinal shoulders formed on the inner faces of the said portions, one on each inner face and so constructed and so arranged relative to the shoulders on the insert as to cooperate with the last said shoulders to prevent removal of the insert in a direction away from the support; means to draw and hold the said portions together.

2. A current collector shoe for mounting on a support and collecting current from a trolley wire, comprising an elongated holder portion and a clamping portion and a separately formed insert to engage the trolley wire, the said portions being separately formed and providing a rectangular recess therebetween in which the insert is positioned; the insert having longitudinal shoulders, one on each side face of the insert and intermediate the upper and lower longitudinal edges of the insert; longitudinal shoulders formed on the inner faces of the said portions, one on each inner face and so constructed and so arranged relative to the shoulders on the insert as to cooperate with the last said shoulders to prevent removal of the insert in a direction away from the support; means on said holder portion only to secure the shoe to a support and means to permit the clamping portion of the shoe to be adjusted laterally relative to the holder portion whereby the insert may be positioned in the recess through the top opening thereof without disturbing the assembly of the holder portion with the support and further the clamping portion may be drawn into clamping engagement with the insert.

3. A current collector shoe to engage a trolley wire to collect current therefrom, comprising an elongated retainer of metal having spaced flanges forming an elongated groove therebetween, an elongated opening between the flanges; a separately formed insert of electrically conducting material positioned in the opening; the retainer being formed of two parts with the opening entirely in one part and the other part forming a laterally adjustable side wall closing one side only of the opening, the inner faces of the said parts adjacent the opening being parallel and having an upper width which is less than the lower width, the junction of the two widths forming a longitudinal shoulder on each inner face of the said parts; the insert having a longitudinal shoulder on each side face which cooperates with the shoulders on the said parts to hold the insert against displacement in one direction; means associated with each end of the said parts to draw the parts together and into engagement with the insert and to permit the aforesaid second mentioned part to be moved laterally away from the first mentioned part sufficiently to allow the said shoulders to disengage and the insert removed upwardly from the opening without disturbing the first mentioned part and its connection to a support and means on the first mentioned part to cooperate with means on a support to secure the first part to the support.

4. An insert holder for a current collector shoe comprising an elongated frame of two separately formed parts, each part having elongated upstanding walls forming therebetween a longitudinal groove, one part having an opening formed by the side wall thereof and two projecting portions therefrom forming the end walls of the opening, the opening in the said part having an open top and an open side opposite the side wall, the open side being closed by the side wall of the other part when the parts are in cooperative relation, the opening being longer than wide and wider than the space between the side walls above the opening, adjustable means to hold the parts in cooperative relation and means on the said one part to secure it to a support and permit the removal of the other part without removal of the one part from the support to permit the removal or renewal of the insert laterally with respect to the opening.

EDMUND C. RYAN.